E. P. WALLING.
Apparatus for Washing Dishes and Table-Cutlery.
No. 218,410. Patented Aug 12, 1879.
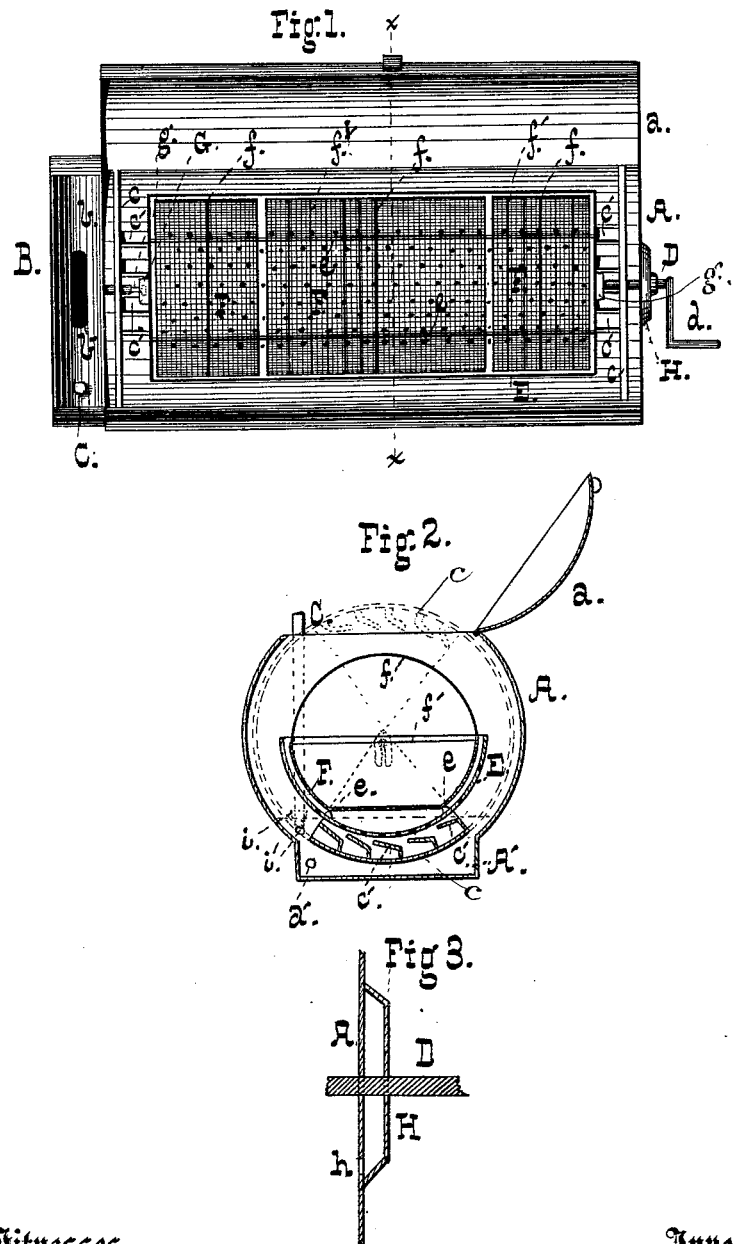

UNITED STATES PATENT OFFICE.

EDMUND P. WALLING, OF PRAIRIE VALLEY, TEXAS.

IMPROVEMENT IN APPARATUS FOR WASHING DISHES AND TABLE-CUTLERY.

Specification forming part of Letters Patent No. 218,410, dated August 12, 1879; application filed June 10, 1879.

*To all whom it may concern:*

Be it known that I, EDMUND P. WALLING, of Prairie Valley, Hill county, State of Texas, have invented certain new and useful Improvements in Apparatus for Washing Dishes, Table-Cutlery, &c.; and I hereby declare the same to be fully, clearly, and exactly described as follows, reference being had to the accompanying drawings, in which—

Figure 1 is a plan view of the device, the top being raised; Fig. 2, a transverse sectional view on line $x\ x$, Fig. 1; Fig. 3, an enlarged view of the device for preventing leakage around the shaft.

My invention has reference to apparatus for washing dishes, knives, forks, spoons, and similar articles, and is designed especially with a view to secure immunity from all danger of breakage, while thoroughly cleansing the articles.

In the accompanying drawings, A is a casing, preferably cylindrical in cross-section, provided with a hinged lid, $a$, and bottom recess, A'. D is a crank-shaft, to which is secured, on the interior of the casing, a frame, $c$, carrying a series of buckets, $c'\ c'$, similar in construction to those of an ordinary water-wheel, except that they are on the interior instead of the exterior, of a circumferential plate. The frame $c$ rests on a pin, $g$, in the opposite end of the casing.

E is a perforated semi-cylinder, also mounted on the shaft D and pin $g$, but it is maintained thereon in a vertical position, the end of the pin $g$ being flattened laterally, (see Fig. 1,) and the supporting-lug G of the casing E fitting closely against the flattened portion. This construction admits of the ready removal of the semi-cylindrical casing E while retaining it at same time in the casing A in a vertical position.

Longitudinal ribs $e\ e$ are secured in the casing E, on which rest the wire-gauze or perforated baskets F F, having handles $f$, and transverse dividing-wires $f'\ f'$, these latter being designed to separate the articles to be washed.

B is a supplementary reservoir at one end of the casing, communicating with it by means of a pipe, $i$, opening at $i'$ into the base of the casing A. This pipe is normally closed by a plug, C, projecting up through the top of the reservoir. This top $b$ is concave, as shown, and is perforated at $b'$, the design being to facilitate its filling, and to admit of the lid serving as a draining-place for spoons, forks, &c.

Outside the main casing, and surrounding the shaft D, is a plate, H, the walls of the casing A being perforated at $h$, at the bottom of the inclosed space. Any water that leaks between the shaft and its bearing in the walls, into the space inclosed by the plate H, runs back through the holes $h$.

A discharge-pipe, $a'$, leads from the bottom of the device, and is normally closed by a cork.

In operation, the dishes to be washed are placed in the baskets F, which are then laid on the ribs $e$ in the casing E. Water being supplied to the device (it being about one-fourth filled) it is set upon the range or stove until the water boils briskly and the dishes are thoroughly steamed. The crank $d$ is then turned, causing the buckets to revolve and deliver the water upon the dishes. When the operation is complete the baskets are removed and the dishes, &c., are wiped dry.

The reservoir B is designed to supply water to the casing when needed without necessitating its removal from the stove.

What I claim is—

In combination with the casing A, having cage E, baskets F, and buckets $c'$, the reservoir B, having concave perforated top, as set forth.

EDMUND P. WALLING.

Witnesses:
R. V. HICKS,
JAMES M. ANDERSON.